United States Patent
Zhou et al.

(10) Patent No.: US 11,946,917 B2
(45) Date of Patent: Apr. 2, 2024

(54) DETECTION METHOD OF POLYETHYLENE GLYCOL MONOMETHYL ETHER RESIDUE IN MEDICINAL MATERIALS

(71) Applicant: SHANXI KANGBAO BIOLOGICAL PRODUCT CO., LTD, Shanxi (CN)

(72) Inventors: Kai Zhou, Shanxi (CN); Junwen Wu, Shanxi (CN); Fan Wang, Shanxi (CN); Zhaowei Yan, Shanxi (CN); Yanfei Li, Shanxi (CN)

(73) Assignee: SHANXI KANGBAO BIOLOGICAL PRODUCT CO., LTD, Shanxi (CN)

( * ) Notice: Subject to any disclaimer, the term of this patent is extended or adjusted under 35 U.S.C. 154(b) by 994 days.

(21) Appl. No.: 15/931,617

(22) Filed: May 14, 2020

(65) Prior Publication Data

US 2020/0309749 A1 Oct. 1, 2020

(30) Foreign Application Priority Data

Jun. 25, 2019 (CN) .......................... 201910557488.0

(51) Int. Cl.
*G01N 30/88* (2006.01)
*G01N 30/04* (2006.01)
*G06F 17/18* (2006.01)

(52) U.S. Cl.
CPC ............. *G01N 30/88* (2013.01); *G01N 30/04* (2013.01); *G06F 17/18* (2013.01); *G01N 2030/042* (2013.01); *G01N 2030/885* (2013.01)

(58) Field of Classification Search
CPC .. G01N 30/88; G01N 30/04; G01N 2030/042; G01N 2030/885; G01N 30/34;
(Continued)

(56) References Cited

U.S. PATENT DOCUMENTS

2003/0066803 A1* 4/2003 Wright ............... G01N 30/8665
210/656
2013/0008859 A1* 1/2013 Witt ....................... G01N 30/02
204/600
(Continued)

FOREIGN PATENT DOCUMENTS

CN 106153798 A * 11/2016 ............. G01N 30/88
CN 106633015 A * 5/2017 ............. C12N 15/87

OTHER PUBLICATIONS

English Translation of Wang et al Patent Publication CN106633015A, published May 2017. (Year: 2017).*
(Continued)

*Primary Examiner* — Joseph W Drodge

(57) ABSTRACT

A detection method of polyethylene glycol monomethyl ether residue in medicinal materials is provided, which belongs to a technical field of medicinal chemical component detection, and includes: detecting a residual amount of mPEG-2000 in 3000-3400 small-molecule mPEG-b-PDLLA by high-performance liquid chromatography with an evaporative light scattering detector. The present invention solves a problem that the copolymer polyethylene glycol monomethyl ether mPEG and the product polyethylene glycol monomethyl ether-polylactic acid block copolymer mPEG-b-PDLLA are difficult to be separated in the high-performance liquid chromatography and there is no UV absorption. The present invention also has high resolution, high sensitivity, sufficient reproducibility and sufficient selectivity.

4 Claims, 4 Drawing Sheets

(58) Field of Classification Search
CPC .. G01N 30/74; G01N 2030/884; G01N 30/02; G01N 30/36; G01N 2030/045; G01N 2030/047; G01N 2030/8624; G01N 2030/8631; G01N 2030/8637; G01N 2030/8679; G01N 21/25; G01N 21/47; G06F 17/18

See application file for complete search history.

(56) References Cited

U.S. PATENT DOCUMENTS

| | | | |
|---|---|---|---|
| 2014/0315318 A1* | 10/2014 | Lu | G01N 21/49 436/131 |
| 2015/0366806 A1* | 12/2015 | Trieu | A61K 47/34 514/449 |
| 2016/0238573 A1* | 8/2016 | Venkatramani | G01N 30/463 |
| 2019/0060463 A1* | 2/2019 | Wang | A61K 31/713 |
| 2020/0038374 A1* | 2/2020 | Dyckman | A61P 43/00 |

OTHER PUBLICATIONS

English Translation of Jia et al Patent Publication CN106153798A, published Nov. 2016. (Year: 2016).*

* cited by examiner

DETECTION METHOD OF POLYETHYLENE GLYCOL MONOMETHYL ETHER RESIDUE IN MEDICINAL MATERIALS

CROSS REFERENCE OF RELATED APPLICATION

The present invention claims priority under 35 U.S.C. 119(a-d) to CN 201910557488.0, filed Jun. 25, 2019.

BACKGROUND OF THE PRESENT INVENTION

Field of Invention

The present invention belongs to a technical field of medicinal chemical component detection, which relates to a detection method of polyethylene glycol monomethyl ether residue and more particularly to a detection method of polyethylene glycol monomethyl ether residue in medicinal materials.

Description of Related Arts

In recent years, with the rapid development of biological pharmacy, physical pharmacy, industrial pharmacy and other disciplines, microparticle preparation, also known as microparticle drug delivery system, has attracted much attention. The microparticle delivery system refers to a solid, liquid or gaseous pharmaceutical preparation with a certain particle size (micron or nanometer) prepared by certain dispersion and embedding technology of a drug and a suitable carrier (generally a biodegradable material). Such system is one large class of pharmaceutical preparations that can mask the bad odor and taste of the drug, solidify the liquid drug, reduce the compatibility change of the compound drug, improve the solubility of the insoluble drug, increase the bioavailability of the drug, improve the stability of the drug, reduce the adverse drug reaction, delay drug release, or improve drug targeting. Among them, the most remarkable aspect is the use of biodegradable amphiphilic block copolymers as pharmaceutical carriers to form polymer micelle microparticle delivery systems.

Amphiphilic block copolymer refers to a copolymer that has both a hydrophobic segment and a hydrophilic segment in the molecular structure, and each segment is a homopolymer segment composed of different units, which are then combined with each other to form a main chain through covalent bonds. Nano-micelles are self-assembled in water to form a "shell-core" structure, in which the hydrophilic blocks are micellar shells and the hydrophobic blocks are micellar cores. Amphiphilic block copolymers have the following advantages: (1) The hydrophobic to core can carry poorly soluble drugs, which greatly improves the solubility of the drug. Taking paclitaxel as an example, its inherent solubility is 1-3 $\mu g \cdot mL^{-1}$, which can be increased to 10 $mg \cdot mL^{-1}$ by the polymer micelle. (2) The hydrophilic shell protects the drug molecules inside the micelles from being adsorbed and degraded by the outside environment, and at the same time, it can help drugs escape the reticuloendothelial is system and prolong drug circulation time. (3) The amphiphilic block copolymers can control the release of drugs, reduce adverse reactions, and optimize the distribution of drugs in the body to achieve better therapeutic effects.

There are many types of amphiphilic block copolymers, but only a limited number thereof can be used in pharmaceuticals since they are limited to requirements such as biocompatibility. Conventionally, hydrophilic segments in wide use are polyethylene glycol (PEG), polyethylene glycol monomethyl ether (mPEG), etc., and the hydrophobic segments are polylactic acid (PLA), wherein poly D,L-lactic acid (PDLLA) is degraded and absorbed faster than poly-L-lactic acid (PLLA). It takes 6-18 months for PDLLA to be fully absorbed in the body, while 8 months to 4 years for PLLA. At the same time, PLA degradation products are carbon dioxide and water, which is not harmful to the body.

The polyethylene glycol monomethyl ether-polylactic acid (mPEG-b-PDLLA) small molecular weight (3000-3400) block copolymer formed by mPEG-2000 and PDLLA has its uniqueness in a microparticle delivery system when it is used as a drug carrier. On the one hand, the proportion of hydrophilic segments (PDLLA) is relatively high, which can improve the compatibility and dispersibility of the carrier and the drug; and on the other hand, the water-insoluble drugs are more likely to form small particle micelles. Conventionally studies show that in comparing the therapeutic effects of 30 nm, 50 nm, 70 nm, and 100 nm nanoparticles in pancreatic cancer, nanoparticles with a particle size of 30 nm have higher penetration ability and better therapeutic effects.

However, both the starting reactant polyethylene glycol monomethyl ether (mPEG-2000) and the product polyethylene glycol monomethyl ether polylactic acid block copolymer (mPEG-b-PDLLA) are non-ionic copolymers. Both have similar block structures, and mPEG has no ultraviolet absorption, which makes it difficult to effectively separate them when using high-performance liquid chromatography to detect mPEG residue in mPEG-b-PDLLA. The residue of mPEG-2000 will affect the encapsulation of hydrophobic drugs by mPEG-b-PDLLA, thus affecting the safety and effectiveness of the drug formulation. According to the "*Technical Guiding Principles for the Study of Impurities in Chemical Drugs*", unreacted substances are process impurities, and their residual amounts need to be detected in the final products, so as to meet the requirements for use as pharmaceutical carriers and pharmaceutical excipients. Therefore, it is necessary to design a method that can accurately, quickly and quantitatively detect the residual amount of mPEG-2000 in small molecules (3000-3400) mPEG-b-PDLLA.

In order to detect the residual amount of mPEG-2000 in small molecules (3000-3400) mPEG-b-PDLLA, the present invention proposed a detection method of polyethylene glycol monomethyl ether residue in polyethylene glycol monomethyl ether-polylactic acid block copolymer medicinal materials by using high-performance liquid chromatography and evaporative light detector.

SUMMARY OF THE PRESENT INVENTION

An object of the present invention is to provide a detection method of polyethylene glycol monomethyl ether residue in medicinal materials.

Accordingly, in order to accomplish the above objects, the present invention provides:

a detection method of polyethylene glycol monomethyl ether residue in medicinal materials, comprising: detecting a residual amount of mPEG-2000 (polyethylene glycol monomethyl ether) in 3000-3400 small-molecule mPEG-b-PDLLA (polyethylene glycol monomethyl ether-polylactic acid) by high-performance liquid chromatography with an evaporative light scattering detector.

Preferably, the detection method specifically comprises steps of:
1) setting chromatographic conditions:
    for the evaporative light scattering detector, a gain: 100-200, a drift tube temperature: 90-100° C., and a physicochemical gas pressure: 35-40.0 psi;
    for a liquid chromatography column with a high-purity silica gel matrix as a filler,
    a flow rate: 0.8-1.0 ml/min;
    a column temperature: 25-35° C.;
    an injection volume: 20 μL;
    for a mobile phase A: a volume ratio of 95:5 of 0.3 mmol/L ammonium acetate solution:acetonitrile, containing 0.2% acetic acid;
    for a mobile phase B: a volume ratio of 5:95 of 0.3 mmol/L amm acetate solution:acetonitrile, containing 0.2% acetic acid;
2) drawing a standard curve, which specifically comprises steps of:
    dissolving a mPEG-2000 reference substance in the mobile phase A to prepare mPEG-2000 standard solutions with different gradient concentrations between 25 μg/mL and 100 μg/mL, and detecting after filtration at 0.45 microns; during detecting, processing the mobile phase A and the mobile phase B with gradient elution: 0-10 minutes from elution start, the mobile phase A 85%, the mobile phase B 15%; 11-30 minutes from elution start, the mobile phase A 65%, the mobile phase B 35%; 31-40 minutes from elution start, the mobile phase A 50%, the mobile phase B 50%; 41-45 minutes from elution start, the mobile phase A 85%, the mobile phase B 15%; and
    using logarithmic values of chromatographic peak areas as ordinates and logarithmic values of concentrations of the mPEG-2000 standard solutions as abscissas, plotting test results of the high-performance liquid chromatography as standard curves and then fitting to obtain a standard curve equation:

$Y=KX+b$, wherein Y refers to the logarithmic values of the chromatographic peak areas, X refers to the logarithmic values of the mPEG-2000 concentrations, and K and b are constants;
3) preparing a test sample, which specifically comprises steps of: preparing the mPEG-b-PDLLA into a sample solution with a concentration of about 9.9-10.5 mg/mL with the mobile phase A; and
4) detecting, which specifically comprises steps of: loading the sample solution, and then loading the mPEG-2000 standard solutions; comparing chromatograms of the sample solution and the standard solutions; identifying the mPEG-2000 in the sample solution by a relative retention time between the sample solution and the standard solutions; placing a logarithmic value of a chromatographic peak area of the mPEG-2000 in the test sample into the standard curve equation to calculate a concentration of the mPEG-2000 in the sample, and then calculating residual amount of the mPEG-2000 by an external standard method.

Preferably, a specification of the liquid chromatography column with the high-purity silica gel matrix as the filler is 4.6 mm×250 mm, 5 μm.

Preferably, the mPEG-2000 reference substance is dissolved in the mobile phase A to prepare the mPEG-2000 standard solutions with concentrations of 100 μg/ml, 50 μg/ml and 25 μg/ml.

The high-performance liquid chromatography (HPLC) is an important branch of chromatography, which uses a chromatographic column whose mobile phase adopts a single solvent of different polarity or a mixed solvent of different ratios, buffers, etc., and uses a high-pressure system to pump the mobile phase into a stationary phase. After being separated in the column, different components enter a detector (usually a UV detector) for detection, thereby analyzing the samples. However, the UV detector needs to detect substances that have UV absorption, while the evaporative light detector is a universal detector that is suitable for all substances with a higher boiling point than the mobile phase. In addition, gradient elution is available when using the evaporative light detector, so it is widely used especially for macromolecular substances with no UV absorption or with UV terminal absorption. According to the present invention, both the polyethylene glycol monomethyl ether mPEG-2000 and the polyethylene glycol monomethyl ether polylactic acid block copolymer mPEG-b-PDLLA are non-ionic copolymers. Both have similar block structures, and mPEG has no ultraviolet absorption, which makes it difficult to effectively separate them when using the high-performance liquid chromatography to detect mPEG residue in mPEG-b-PDLLA. Therefore, the present invention detects the residual amount of polyethylene glycol monomethyl ether mPEG-2000 in 3000-3400 small-molecule polyethylene glycol monomethyl ether-polylactic acid mPEG-b-PDLLA by the high-performance liquid chromatography with the evaporative light scattering detector.

Compared with the prior art, the present invention has the following ad vantages:
(1) By optimizing the chromatographic elution conditions, the problem that the copolymer polyethylene glycol monomethyl ether mPEG and the product polyethylene glycol monomethyl ether-polylactic acid block copolymer mPEG-b-PDLLA are difficult to be separated in the high-performance liquid chromatography and there is no UV absorption is solved. The evaporative light detector is used to carry out a special detection on free polyethylene glycol monomethyl ether-2000 to avoid interference of other impurities to the greatest extent.
(2) It can be proved from perspective of spectroscopy whether the polyethylene glycol monomethyl ether-2000 residue has been completely removed from the sample. Therefore, when using the polyethylene glycol monomethyl ether-polylactic acid block copolymer as a new pharmaceutical excipient and preparing pharmaceutical micelle to form a polymer particle delivery system, residual amount of synthetic raw materials in the excipient can be well controlled.
(3) The present invention has high resolution, high sensitivity, sufficient reproducibility and sufficient selectivity. Furthermore, sample pretreatment is simple, which can accurately and quickly perform qualitative and quantitative analysis about the residual amount of the polyethylene glycol monomethyl ether-2000 in the polyethylene glycol monomethyl ether-polylactic acid block copolymer.

DETAILED DESCRIPTION OF THE PREFERRED EMBODIMENT

The following is merely a preferred embodiment of the present invention, and are not intended to be limiting in any way. For those skilled in the art, the present invention may have various modifications and changes. Any modification, equivalent replacement, and improvement made within the spirit and principle of the present invention shall be included in the protection scope thereof.

A detection method of polyethylene glycol monomethyl ether residue in medicinal materials comprises steps as follows.

I. Chromatographic Conditions:
1. Chromatographic column: liquid chromatography column (4.6 mm×250 mm, 5 μm) with high-purity silica gel matrix as filler;
2. Detector: waters2424 evaporative light scattering detector, instrument to parameters: gain: 100, drift tube temperature: 100° C., physicochemical gas (air) pressure: 40.0 psi;
3. Mobile phase:
Mobile phase A: 0.3 mmol/L ammonium acetate solution-acetonitrile (volume ratio 95:5, containing 0.2% acetic acid)
Mobile phase B: 0.3 mmol/L ammonium acetate solution-acetonitrile (volume ratio 5:95, containing 0.2% acetic acid);
perform gradient elution according to the following table:

| Time (min) | Mobile phase A (%) | Mobile phase B (%) |
| --- | --- | --- |
| 0 | 85 | 15 |
| 10 | 65 | 35 |
| 30 | 50 | 50 |
| 40 | 60 | 40 |
| 43 | 85 | 15 |

4. Flow rate: 0.8-1.0 ml/min;
5. Column temperature: 25-35° C.;
6. Injection volume: 20 μL.

Figure 1:
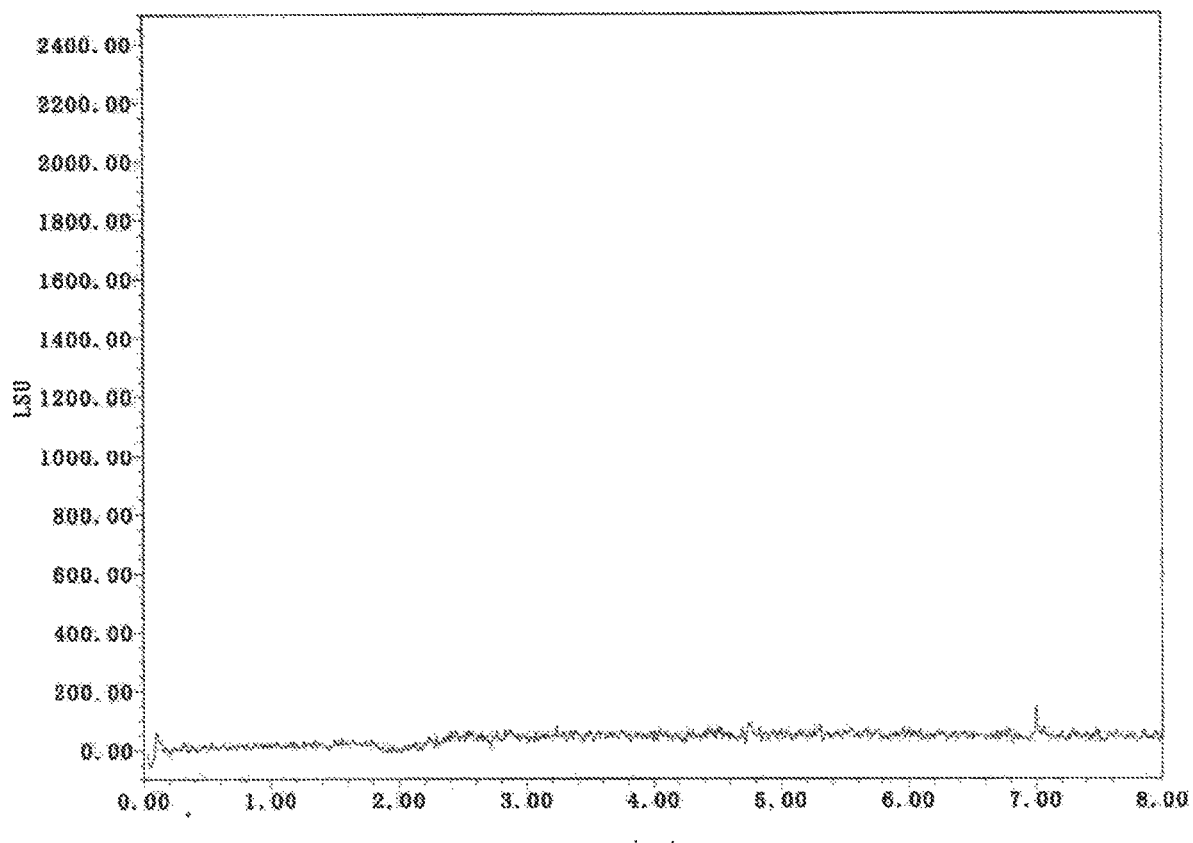
FIG. 1 is a chromatogram of a blank solvent.
Figure 2:
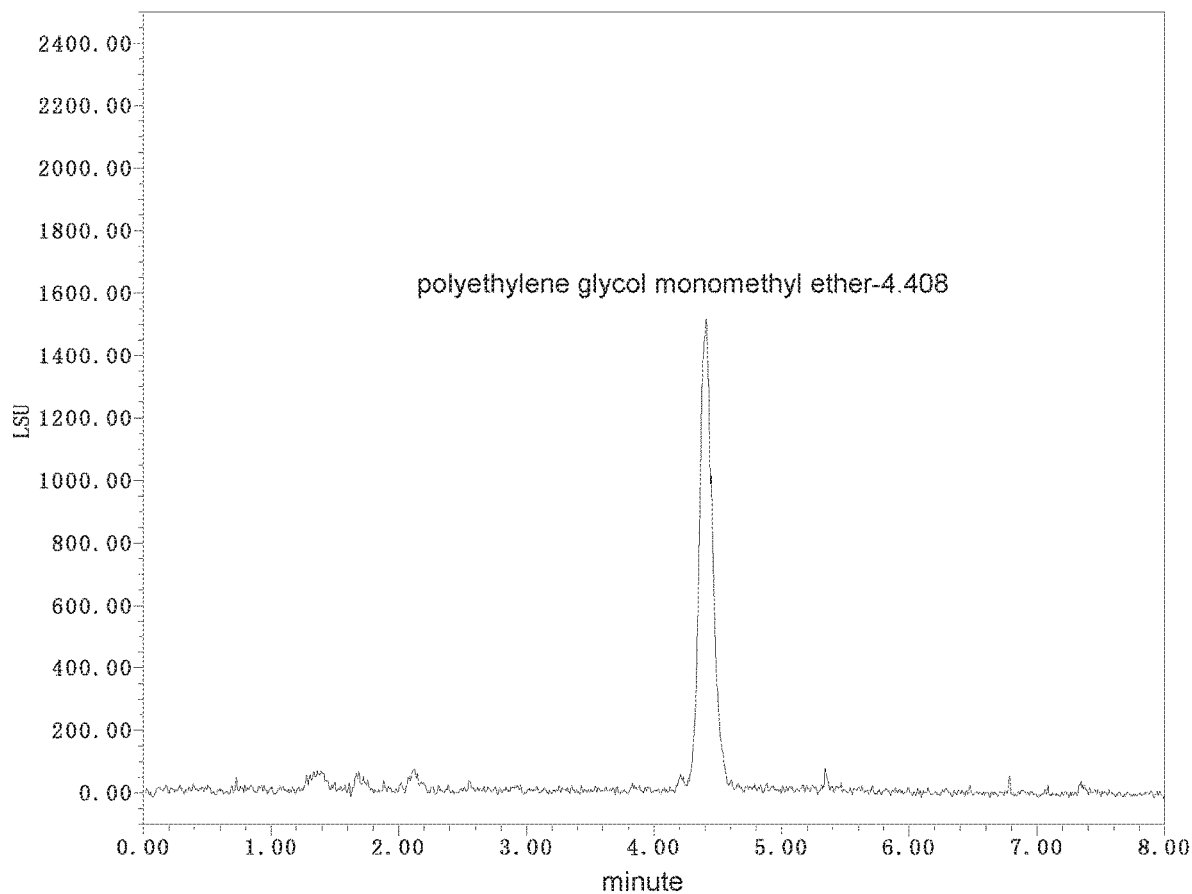
FIG. 2 is a chromatogram of a reference substance.

II. Standard Curve:
accurately weighing polyethylene glycol monomethyl ether-2000 reference substance and dissolving in the mobile phase A, and using the mobile phase A to prepare reference solutions with a concentration of C1=100 μg/ml; C2=50 μg/ml; C3=25 μg/ml; loading the mobile phase A and the reference solutions with three different concentrations after passimg through a 0.45 μm filter; using the mobile phase A as a blank solvent, and a chromatogram thereof is shown in FIG. 1; wherein a peak chromatogram of the polyethylene glycol monomethyl ether-2000 (mPEG-2000) reference substance is shown in FIG. 2; test results are shown in Table 1.

TABLE 1 test results of reference substance with different concentrations

Figure 3:
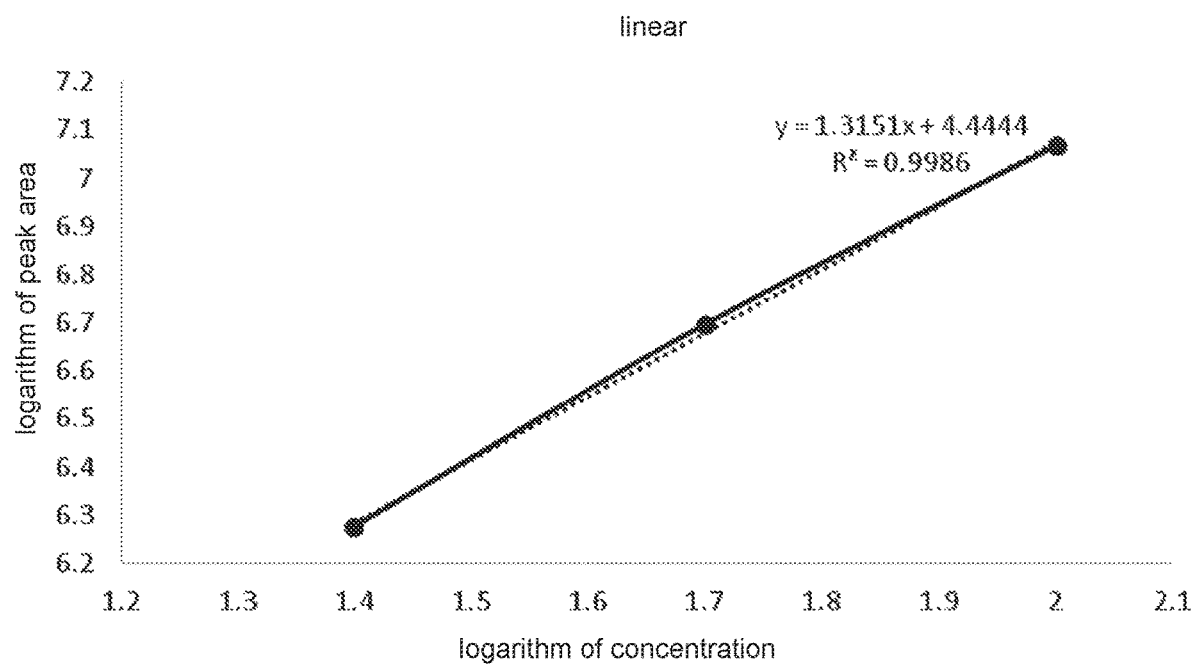
FIG. 3 is a standard curve of polyethylene glycol monomethyl ether-2000 (mPEG-2000)

| | Concentration (μg/ml) | Logarithm of concentration | Peak area | Logarithm of peak area |
| --- | --- | --- | --- | --- |
| Reference 1 | 100.2 | 2.0009 | 11671564 | 7.0671 |
| Reference 2 | 50.1 | 1.6998 | 4974625 | 6.6968 |
| Reference 3 | 25.05 | 1.3988 | 1885070 | 6.2753 | using logarithmic values of chromatographic peak areas as ordinates and logarithmic values of concentrations of the mPEG-2000 standard solutions as abscissas, plotting test results of the high-performance liquid chromatography as standard curves and then fitting to obtain a standard curve equation: Y=1.31.51 X+4.4444, regression coefficient $R^2$=0.9986, and the standard curve of the polyethylene glycol monomethyl ether-2000 (mPEG-2000) is shown in FIG. 3.

Figure 4:
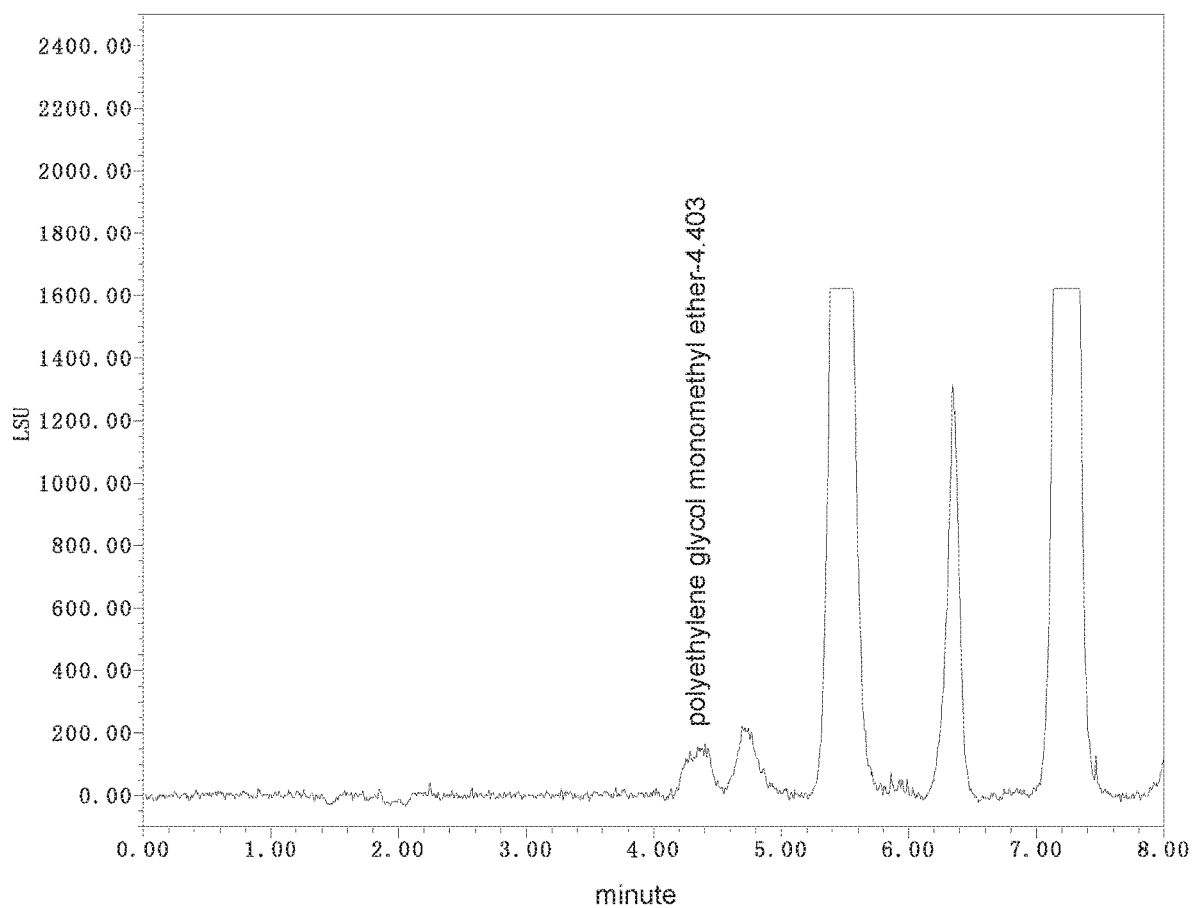
FIG. 4 is a chromatogram of a polyethylene glycol monomethyl ether-polylactic acid block copolymer (mPEG-b-PDLLA) sample.

III. Sample Testing:
accurately weighing 0.5 g polyethylene glycol monomethyl ether-polylactic acid block copolymer (mPEG-b-PDLLA), diluting with the mobile phase A and dissolving in a 50 mL, volumetric flask; metering volume and shake well; loading and detecting according to the above instrument conditions after passing through a 0.45 μm filter; placing a logarithmic value of a chromatographic peak area obtained into the standard curve equation, and then calculating residual amount of the mPEG by an external standard method, which is 0.08%; wherein sample chromatogram of the polyethylene glycol monomethyl ether-polylactic acid block copolymer (mPEG-b-PDLLA) is shown in FIG. 4.

IV. Analysis of Results
1. Curve linearity: according to the above method, using logarithmic values of chromatographic peak areas as ordinates and logarithmic values of concentrations of the mPEG-2000 standard solutions as abscissas, plotting test results of the high-performance liquid chromatography as standard curves and then fitting to obtain a standard curve equation: Y=1.3151X+4.4444, regression coefficient $R^2$=0.9986, indicating that the polyethylene glycol monomethyl ether-2000 standard solution has good linearity in the concentration range of 25 μg/ml-100 μg/ml.
2. Precision: using 50 μg/mL polyethylene glycol monomethyl ether-2000 standard solution, loading 20 μL each time, and performing 6 consecutive loading; detecting according to the above chromatographic conditions, recording peak areas, and calculating the precision; wherein the peak areas of the six loadings of the precision experiments were 4984625, 4976305, 4965280, 4975876, 4964958, and 4975628; relative deviation calculated based on the peak areas was 0.15%, indicating good precision.
3. Reproducibility: taking the sample solution processed according to the above method, which has a concentration of about 20 mg/mL, loading 20 μL each time, and performing 6 consecutive loading; detecting according to the above chromatographic conditions, recording peak areas, and calculating the reproducibility; wherein the peak areas of the six loadings of the reproducibility experiments were 543699, 534580, 523416, 534610, 534582, 528706; relative deviation calculated based on the peak areas was 1.3%, indicating good reproducibility.
4. Stability: using 50 μg/mL polyethylene glycol monomethyl ether-2000 standard solution, placing at room temperature, and loading at 0 h, 2 h, 4 h, 8 h, 12 h and 24 h with 20 μL each time; detecting according to the above chromatographic conditions, and comparing the stability of the results; wherein the peak areas of the six loadings of the stability experiments were 4978623, 4988315, 4975480, 4968654, 4987521, and 4979156; relative standard deviation calculated based on the peak areas were 0.15%, indicating that the polyethylene glycol monomethyl ether solution is to relatively stable after placing at room temperature for 24 h.

What is claimed is:

1. A detection method of polyethylene glycol monomethyl ether (mPEG-2000) residue in mPEG-b-PDLLA comprising steps of:
   1) providing a high-performance liquid chromatography (HPLC) chromatographic device as follows:
      setting an evaporative light scattering detector of the high-performance liquid chromatography (HPLC) device to operate at: a gain: 100-200, a drift tube temperature: 90-100° C., and a physicochemical gas pressure: 35-40.0 psi;
      setting a liquid chromatography column of the high-performance liquid chromatography device, which includes a high-purity silica gel matrix as a filler in the column to operate at:
      a flow rate: 0.8-1.0 ml/min;
      a column temperature: 25-35° C.; and
      an injection volume: 20 uL;
      introducing a mobile phase A into the high-performance liquid chromatography column having: a volume ratio of 95:5 of 0.3 mmol/L ammonium acetate solution: acetonitrile, containing 0.2% acetic acid; and
      then introducing a mobile phase B into the high-performance liquid chromatography column having: a volume ratio of 5:95 of 0.3 mmol/L ammonium acetate solution:acetonitrile, containing 0.2% acetic acid;
   2) drawing a standard curve, which specifically comprises steps of:
      dissolving a mPEG-2000 reference substance in the mobile phase A to prepare
      mPEG-2000 standard solutions with different gradient concentrations between 25 μg/ml and 100 μg/ml, and detecting the mPEG-2000 concentration of the solutions with the detector of the chromatography device after filtration of the solutions in a filter having a pore size of 0.45 microns; during the detecting, introducing the mobile phase A and the mobile phase B as a gradient elution solution: from 0-10 minutes after a starting of elution, the elution solution comprising the mobile phase A being 85% of the elution solution, and the mobile phase B being 15% of the elution solution; from 11-30 minutes after the elution starting the mobile phase A being 65% of the elution solution, and the mobile phase B being 35% of the elution solution; from 31-40 minutes after the elution starting the elution solution comprising the mobile phase A being 50% of the elution solution, and the mobile phase B being 50% of the elution solution; and from 41-45 minutes after the elution starting, the elution solution comprising the mobile phase A being 85% of the elution solution, and the mobile phase B being 15% of the elution solution; and
      using logarithmic values of chromatographic peak areas as ordinates and logarithmic values of concentrations of the mPEG-2000 standard solutions as abscissas, plotting test results of the high-performance liquid chromatography as standard curves and then fitting to obtain a standard curve equation:

$Y=KX+b$, wherein Y refers to the logarithmic values of the chromatographic peak areas, X refers to the logarithmic values of the mPEG -2000 concentrations, and K and b are constants;
   3) preparing a test sample, which specifically comprises steps of: preparing the mPEG-b-PDLLA into a sample solution with a mPEG-b-PDLLA concentration of about 9.9-10.5 mg/mL and comprising the mobile phase A; and
   4) detecting the mPEG-2000 residue in the sample solution with the detector of the chromatography device, which specifically comprises steps of: loading the sample solution in the column, and then loading the mPEG-2000 standard solutions in the column; comparing chromatograms of the sample solution and the standard solutions; identifying the mPEG-2000 in the sample solution by a difference of time where the mPEG-2000 is retained between the sample solution and the standard solutions; placing a logarithmic value of a chromatographic peak area of the mPEG-2000 in the test sample into the standard curve equation to calculate a concentration of the mPEG-2000 in the sample solution, and then calculating a residual amount of the mPEG-2000 in the sample solution.

2. The detection method, as recited in claim 1, wherein dimensions of the liquid chromatography column are 4.6 mm×250 mm and 5 μm.

3. The detection method, as recited in claim 2, wherein the mPEG-2000 reference substance is dissolved in the mobile phase A to prepare the mPEG-2000 standard solutions with concentrations of 100 μg/ml, 50 μg/ml, and 25 μg/ml.

4. The detection method, as recited in claim 1, wherein the mPEG-2000 reference substance is dissolved in the mobile phase A to prepare the mPEG-2000 standard solutions with concentrations of 100 μg/ml, 50 μg/ml, and 25 μg/ml.

* * * * *